United States Patent [19]
Imaseki

[11] Patent Number: 5,773,957
[45] Date of Patent: Jun. 30, 1998

[54] CHARGE CONTROL SYSTEM FOR SET OF CELLS

[75] Inventor: Takashi Imaseki, Kanagawa-ken, Japan

[73] Assignee: Nissan Motor Co., Ltd., Kanagawa-ken, Japan

[21] Appl. No.: 783,143

[22] Filed: Jan. 14, 1997

[30] Foreign Application Priority Data

Jan. 17, 1996 [JP] Japan .................................. 8-005834

[51] Int. Cl.$^6$ ........................................................ H02J 7/00
[52] U.S. Cl. .......................... 320/116; 320/122; 320/162
[58] Field of Search .................................. 320/5, 6, 7, 15,
320/16, 17, 18, 22, 23, 31, 116, 122, 162

[56] References Cited

U.S. PATENT DOCUMENTS

| 4,238,721 | 12/1980 | DeLuca et al. | 320/18 |
| 4,614,905 | 9/1986 | Petersson et al. | 320/18 |
| 5,387,857 | 2/1995 | Honda et al. | 320/18 |
| 5,438,250 | 8/1995 | Retzlaff | 320/17 |
| 5,557,189 | 9/1996 | Suzuki et al. | 320/18 |
| 5,578,914 | 11/1996 | Morita | 320/18 |

FOREIGN PATENT DOCUMENTS

| 61-206179 | 9/1986 | Japan . |
| 5-64377 | 3/1993 | Japan . |

Primary Examiner—Stuart N. Hecker
Assistant Examiner—K. Shin
Attorney, Agent, or Firm—Lowe, Price, LeBlanc & Becker

[57] ABSTRACT

For a charge to a serial connection or a series-parallel connection of secondary cells or modules thereof, a charger controllable for a reduction of charge current with a response time and bypass circuits each respectively connected in parallel to a corresponding one of the cells or modules are controlled such that a voltage of the corresponding cell or the corresponding module is predicted of a time point after a lapse of the response time, and the reduction of charge current is started when the predicted voltage has reached an upper limit voltage set therefor.

6 Claims, 5 Drawing Sheets

CHARGE CONTROL SYSTEM FOR SET OF CELLS

BACKGROUND OF THE INVENTION

1. Field of the Invention

The present invention generally relates to a charge control system for a set of cells (hereafter sometimes "cell set" or "battery set"), and particularly, to a charge control system for a cell set including a plurality of secondary cells connected in series or in series-parallel.

2. Description of Relevant Art

As typically observed in a storage battery system such as for an electric vehicle, a cell set may sometimes comprise a plurality of secondary cells connected in series or series-parallel.

In such a cell set, each cell has at an arbitrary concerned time a quantity of electricity (hereafter "discharge capacity") that can be discharged therefrom after the concerned time, and that may be defined in terms of a degree of reduction of discharge capacity (hereafter "capacity reduction") at the concerned time relative to a discharge capacity in a fully charged state (hereafter "full capacity") which is inherent to the cell. Thus, letting DOD be a depth of discharge such that a 0% DOD corresponds to a full charge (or full capacity) and a 100% DOD corresponds to a full discharge (or zero capacity), the capacity reduction is representable by a percent value of the DOD.

In such a cell set, therefore, respective cells have their discharge capacities that may well be different therebetween in value of themselves and in degree of capacity reduction. More specifically, respective cells of a cell set have e.g. their full capacities and performances having undergone a dispersion in fabrication and subjected to a temperature distribution that is not always even over a region of the cell set. For such and other reasons, the respective cells have their individual discharge quantities with differences therebetween, as well as their charge reception ratios, i.e. charge-to-discharge efficiencies, and hence their degrees of capacity reduction tend to differ thereamong. Accordingly, those cells have their discharge capacities dispersed, with corresponding different degrees of capacity reduction from a 0% DOD state, and an entirety of the cell set has an associated discharge capacity of itself with a corresponding degree of capacity reduction. In a discharge of such a cell set, at least one of cells therein that has become smaller in discharge capacity than others does finish its discharge earlier, entering an over-discharge state, where it constitutes a load to other cells, which causes a voltage of the cell set to drop, resulting in a finished discharge of the cell set, while all the cells therein have not reached their 100% DOD states.

Moreover, in a final stage of discharge, the cell generally undergoes a progressed deterioration due such as to: (i) an increased internal resistance with an increased internal heat liberation; (ii) cell constituents rendered less stable; and (iii) conduction of a significant local current. Therefore, the over-discharge state of cell may cause an increased degree of deterioration of service life.

On the other hand, in a charge to a cell set following a previous discharge thereof, those cells which did not have reached their 100% DOD states in the previous discharge do reach their 0% DOD states earlier, with a corresponding voltage rise causing the charge to the cell set to finish, while one or more such cells that have undergone their over-discharge states in the previous discharge do not have reached their 0% DOD states, thus resulting in an increased dispersion among cells of the cell set, in terms of DOD, as well as of discharge capacity. Therefore, with repeated discharge and charge of a cell set, such one of cells therein that had a smaller discharge capacity than others yet suffers from a short of charge. As a result, with an extended dispersion, an entirety of the cell set has its discharge capacity decreased.

To this point, the secondary cell generally has a reduced service life, if it is over-charged in excess of a charge stop voltage or if it over-discharges past a discharge stop voltage. Therefore, it has conventionally been typical for an entirety of a cell set to finish a charge or discharge thereof, when at least one cell therein has reached a charge stop voltage or discharge stop voltage.

Thus, there have been issues such that in a cell set having a plurality of secondary cells connected in series, the cells have dispersed discharge capacities or DOD values and hence an entirety of the cell set has a reduced discharge capacity.

To overcome such issues, there has been proposed in Japanese Patent Application Laid-Open Publication No. 61-206179 a conventional charge control system, in which a plurality of bypass circuits are each respectively connected in parallel to a corresponding one of component cells of a cell set, and each bypass circuit is controlled to be conductive to reduce a charge current when the corresponding cell has reached a full charge state, while those cells unfully charged are kept being charged to reduce a dispersion.

Further, to overcome the issues, there have been proposed in Japanese Patent Application Laid-Open Publication No. 5-64377 a pair of conventional charge control systems: one in which a charging to a cell set is stopped when at least one cell of the cell set has reached a full charge state; and the other in which a respective cell having reached a full charge state has its charge current bypassed via a circuit therefor.

In the conventional devices described, a bypass circuit for a cell having reached a full charge state is made conductive to reduce a charge current to the cell, for the protection against an over-charge. Such a bypass circuit however has a limited capacity. As a constant current is supplied from a charger to a cell set, such the bypass circuit tends to fail in a sufficient bypassing of the current, causing an over-charge, in a final stage of charge where respective cells have come near their full charge states. To eliminate such an issue, it is necessary for an output current of the charger to be reduced in the final stage of charge. However, the charger generally has its output circuitry controllable with a time delay due such as to a combination of L and C elements of a smoothing circuit, causing a delayed turn-down of charge current or a hunting reduction of charge current so that, when a cell has reached a full charge state, an actual output current from the charger may be still left on the way of achieving a sufficient reduction, thus resulting in an increased tendency to enter an over-charge state, with an influence to a service life of the cell.

SUMMARY OF THE INVENTION

The present invention has been achieved with such points in mind. It therefore is an object of the present invention to provide a charge control system for a cell set which is adapted to be preventive of an over-charge of cells of the cell set such as due to a delay of control of a charger.

To achieve the object according to a first aspect of the invention, there is provided a charge control system for a cell set including a serial connection or a series-parallel connection of a plurality of cells each respectively composed of a secondary battery or a plurality of modules each respectively consisting of a plurality of cells each respectively composed of a secondary battery, the charge control system comprising a charging means for outputting a charge current to charge the cell set, the charging means being controllable for a reduction of the charge current with a response time, a plurality of bypass circuits each respectively controllable for a current conduction therethrough and connected in parallel to a corresponding one of the plurality of cells or a corresponding one of the plurality of modules, and a control means for controlling the charging means and a respective one of the plurality of bypass circuits to control a charge quantity of the corresponding cell or the corresponding module so that a voltage of the corresponding cell or the corresponding module is predicted with respect to a time point after a lapse of the response time, and the reduction of the charge current is started when the predicted voltage has reached an upper limit voltage set therefor.

According to the first aspect of the invention, a cell voltage is predicted of a time point after a lapse of a necessary response time for a reduction of a charge current output from a charger, and the reduction of the output current is started when the predicted cell voltage has reached an upper limit set for a charge. Accordingly, when the cell voltage has actually reached the upper limit, the charge current is reduced to be desirable for the charge so that it can be bypassed, without an over-charge that otherwise might have been caused with a charger's output current remaining on the way of reduction and having become too excessive to be sufficiently bypassed.

According to a second aspect of the invention, as it depends from the first aspect, the charging means is controllable to reduce the charge current from a normal value thereof to a limited value thereof within the response time, the corresponding cell or the corresponding module has a terminal voltage thereacross, and the predicted voltage is predicted as a sum of the terminal voltage and an increment thereof predicted in correspondence to the response time.

According to a third aspect of the invention, as it depends from the second aspect, the response time is variable in dependence on the normal value of the charge current.

According to a fourth aspect of the invention, as it depends from the third aspect, an initial value of the charge current is representative of the normal value of the charge current.

According to any of the second to the fourth aspect of the invention, terms for a prediction of a cell voltage is defined for a particular application in consideration of a characteristic of a charger.

According to a fifth aspect of the invention, as it depends from any of the first to the fourth aspect, the control means includes a means for detecting the charge current, and a means responsive to the detected charge current to provide the response time in a variable manner.

According to the fifth aspect of the invention, a charge control system is adaptive for a variable response time, including a case in which an initial charge current is different.

According to a sixth aspect of the invention, as it depends from any of the first to the fourth aspect, the control means includes a means for detecting the response time in a current time of the reduction of the charge current, a means for storing the response time of the current time, and a means responsible for the stored response time to provide a correspondent value as the response time in a subsequent time of the reduction of the charge current.

According to the sixth aspect of the invention, an actual response time is detected for a subsequent use, thus permitting a closer control.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1:
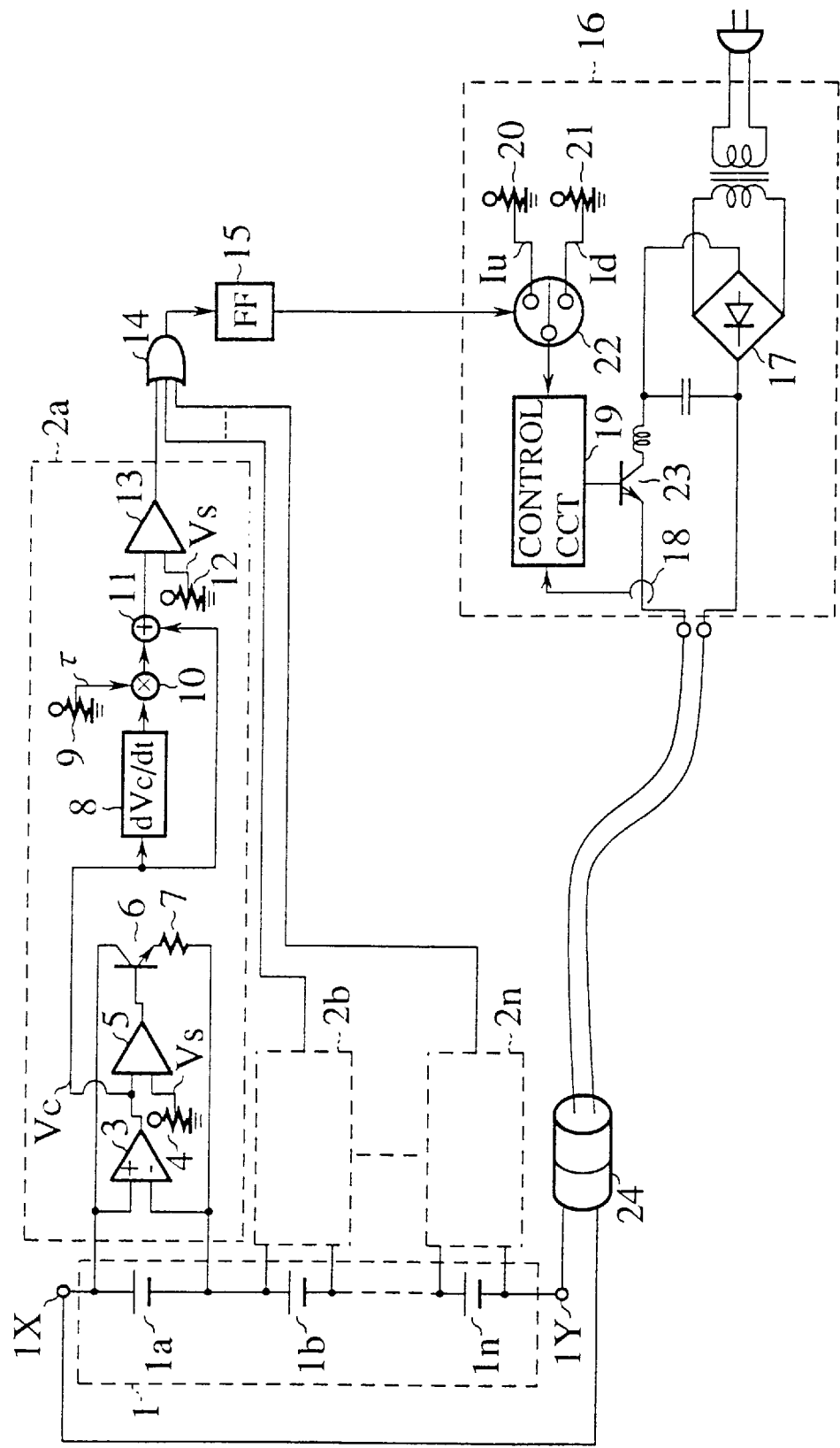
FIG. 1 is a circuit diagram of a charge control system according to an embodiment of the invention.

There will be detailed below the preferred embodiments of the present invention with reference to the accompanying drawings. Like members are designated by like reference characters.

FIG. 1 is a circuit diagram of a charge control system according to a first embodiment of the invention.

In FIG. 1, designated at reference character 1 is a battery set. The battery set 1 consists of a plurality of serially connected component batteries 1a to 1n (hereafter collectively "1i", where i=a, b, . . . ,n), of which an arbitrary one may comprise a single secondary cell composed of a storage battery or a secondary cell module composed of a plurality of such cells. The module may be such one that comprise a total of e.g. six serially connected cells of lead storage batteries and a single enclosure for packaging them. In application to a battery system for electric vehicles, the battery set 1 may be a serial or series-parallel connection of multiple cells or modules between a few tens to several hundreds in total. It is now assumed for a facilitated comprehension that each component battery 1i is a cell. In the figure, designated at reference character 1X is a positive pole terminal of the battery set 1, and 1Y is a negative pole terminal of the set 1. The positive and negative terminals 1X and 1Y are connected via a connector 24 to an electric charger 16 for charging the battery set 1 in a controlled manner. It will be seen that the terminals 1X and 1Y are connected to unshown power output terminals for an external power supply connection such as to an electric drive motor of an electric vehicle.

The component batteries as cells 1i are each respectively connected at its positive and negative terminals in parallel to a corresponding one (2i) of a plurality of charge control circuits 2a to 2n (hereafter collectively "2i"). Each charge control circuit 2i comprises: a cell voltage detector 3 as a differential amplifier connected at (+) and (−) input terminals thereof in parallel to a corresponding cell 1i; a voltage generator 4 as a potentiometer connected between a supply voltage and a ground level; a comparator 5 having one input terminal connected to an-output terminal of the cell voltage detector 3 and another input terminal connected to an output terminal of the voltage generator 4; a switching transistor 6 connected at an emitter thereof through a resistor 7 which has a smaller resistance than an internal resistance of the cell 1$i$ to the negative terminal of the cell 1$i$, at a collector thereof to the positive terminal of the cell 1$i$, and at a base thereof to an output terminal of the comparator 5; a differential operator 8 connected at an input end thereof to the output terminal of the cell voltage detector 3; a voltage setting element 9 as a potentiometer connected between the supply voltage and the ground potential; a multiplier 10 connected at an input terminal thereof to an output terminal of the voltage setting element 9 and at another input terminal thereof to an output end of the differential operator 8; an adder 11 connected at an input terminal thereof to an output terminal of the multiplier 10 and at another input terminal thereof to the output terminal of the cell voltage detector 3; another voltage generator 12 connected between the supply voltage and the ground potential; and another comparator 13 that is connected at an input terminal thereof to an output terminal of the adder 11 and at another input terminal thereof to an output terminal of the voltage generator 12. In the charge control circuit 2$i$, the cell voltage detector 3 detects a terminal voltage Vc across the cell 1$i$. The comparator 5 compares the cell terminal voltage Vc with an output of the voltage generator 4 generating an upper limit voltage Vs in respect of a charge, so that when the cell terminal voltage Vc is equivalent to or higher than the upper limit voltage Vs, the transistor 6 is turned on to conduct a fraction of a charge current via the resistor 7, thereby bypassing the fraction of charge current.

The differential operator 8 outputs a differentiated value $dVc/dt$ of the cell terminal voltage Vc. The voltage setting element 9 is for setting to output a voltage in correspondence to a response time $\tau$ for charge current control, as it is a necessary time period for a reduction of the charge current to be effected from an initial value to a predetermined value in a later-described control of the charger 16, which voltage as response time $\tau$ is multiplied by the differentiated value $dVc/dt$ at the multiplier 10 to obtain a product, of which a result $\tau(dVc/dt)$ is added by the adder 11 to the cell terminal voltage Vc to provide a sum. The adder 11 thus has an output voltage of Vc+$\tau(dVc/dt)$.

The voltage generator 12 generates an upper limit voltage Vs of charge, like the voltage generator 4. The comparator 13 compares the output voltage Vc+$\tau(dVc/dt)$ of the adder 11 with the upper limit voltage Vs, so that a signal of a "1" is output therefrom when the output voltage Vc+$\tau(dVc/dt)$ is equivalent to or higher than the upper limit voltage Vs.

The comparators 13 of the respective charge control circuits 2$i$ have their outputs collected to an OR circuit 14, where they are processed to provide a logical sum so that the OR circuit 14 outputs a "1" if the output of at least one control circuit 2$i$ is a "1". Then, a flip-flop circuit 15 holds therein a logical value output from the OR circuit 14.

On the other hand, the charger 16 comprises: an AC transformer connectable to an unshown AC outlet; a rectifier circuit including a rectifier 17 connected to the transformer, a capacitor connected in parallel to output terminals of the rectifier 17, and an inductor connected at one end thereof to one one side of the capacitor; a pair of output terminals connected, at an external side thereof, to the connector 24 and, at an internal side thereof, either to an output current conductor and the other to the other side of the capacitor; a current sensor 18 bound to the output current conductor; a current control circuit 19 connected at an input thereof to an output terminal of the current sensor 18; a voltage generator 20 as a potentiometer connected between a supply voltage and a ground potential; another voltage generator 21 as a potentiometer connected between the supply voltage and the ground potential; a switching circuit 22 with two inputs connected either to an output terminal of the voltage generator 20 and the other to an output terminal of the voltage generator 21 and one output connected to another input end of the current control circuit 22, the switching circuit 22 being supplied with a logical output signal from the flip-flop circuit 15; and a current-controlling transistor 23 having a collector connected to the other end of the inductor, an emitter connected to the output current conductor and a base connected to an output end of the control circuit 22. The current sensor 18 detects an output current. The voltage generator 20 outputs a voltage corresponding to a charge current Iu in a normal state. The voltage generator 21 outputs a voltage corresponding to a charge current Id, as it is limited or restricted from the normal state such that Iu>Id. The switching circuit 22 is controlled with the output from the flip-flop circuit 15, for a selection to output one of the voltages corresponding to the normal charge current Iu and the limited charge current Id.

There will be described circuit actions in a charging of the foregoing arrangement.

First, in a normal charge state, the flip-flop circuit 15 has an output "0", whereto the switching circuit 22 is responsive to select the input connected to the voltage generator 20, so that it outputs the voltage corresponding to the normal charge current Iu that is equivalent to an initial charge current. The current control circuit 19 is responsible for a combination of the Iu-representative voltage and an output current detected by the current sensor 18 to control the transistor 23 such that the charger 16 outputs a controlled current equivalent to the normal charge current Iu.

As such a charging proceeds, each cell 1$i$ has an increasing terminal voltage thereacross, which is detected by the corresponding control circuit 2$i$. In due course, the adder 11 provides an output voltage such that Vc+$\tau(dVc/dt) \geq$Vs, whereto the comparator 13 is responsive to output a signal "1". Incidentally, in the expression above, $\tau$ represents a response time that a current control of the charger 16 can follow, and $dVc/dt$ means a temporal variation in terminal voltage of the cell 1$i$. Thus, the term $\tau(dVc/dt)$ is representative of a predicted voltage increment or fraction that the terminal voltage of the cell 1$i$ will have with a lapse of time $\tau$, as the voltage keeps increasing as it is. Accordingly, the expression Vc+$\tau(dVc/dt)$ provides a predicted terminal voltage that the cell 1$i$ will have with the lapse of time $\tau$.

In other words, the comparator 13 compares the cell terminal voltage Vc+$\tau(dVc/dt)$ predicted for a time after the lapse of time $\tau$ with the upper limit voltage Vs and, when that predicted cell voltage exceeds this limit voltage, has an output "1", which output is input to the OR circuit 14, which thus provides an output "1", which output is input to the flip-flop circuit 15, where it is held to be output to the switching circuit 22, which responds thereto for selecting the input connected to the voltage generator 21, so that the voltage corresponding to the limited charge current Id is output from the switching circuit 22 to the current control circuit 19, which responds thereto for controlling the transistor 23 to have the output current of the charger 16 controlled to the limited charge current Id with an actual delay equivalent to the response time $\tau$. It will be seen that the flip-flop circuit 15 is reset by an unshown reset circuit before commencement of the charge.

On the other hand, with the proceeding charge, the cell 1$i$ has the increasing terminal voltage, which in due course reaches the upper limit voltage Vs, whereto the switching transistor 6 is responsive to go on, opening a bypass circuit including the resistor 7, so that a controlled charge current to be then conducted through the cell 1i is bypassed via the bypass circuit, thus keeping the cell 1i from being overcharged.

Figure 2A:
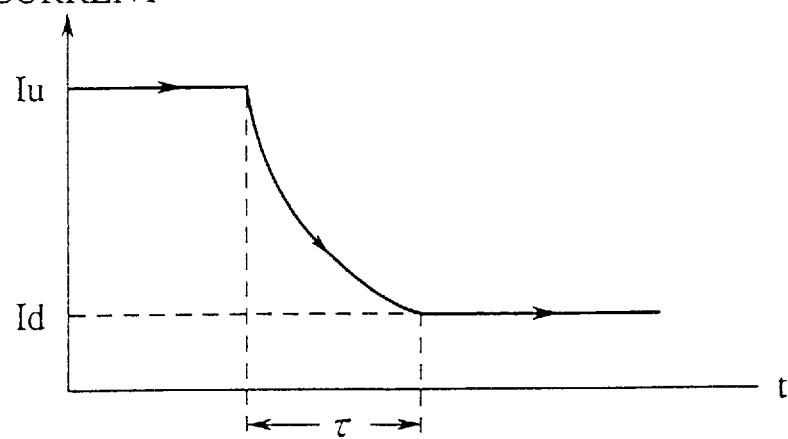
FIG. 2 is a graph of characteristic curves showing variations of an output current of a charger and a terminal voltage of a cell with respect to a time.
Figure 2B:
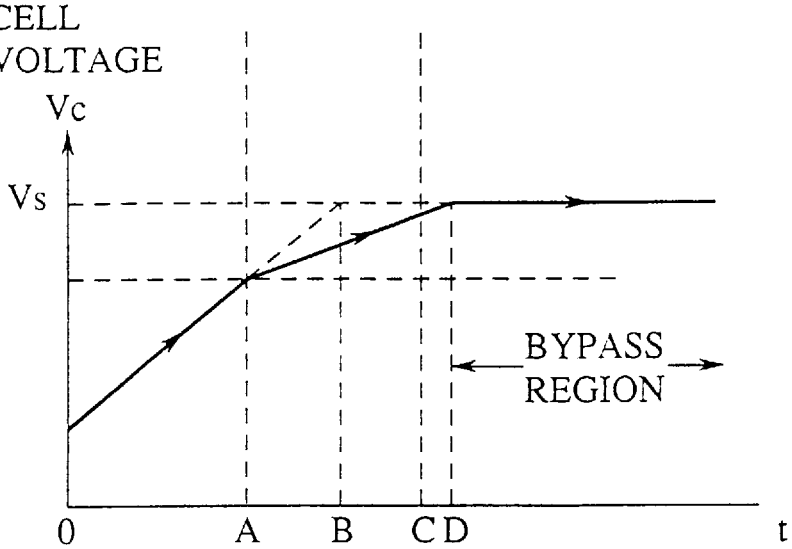

FIG. 2 shows a relationship between the output current from the charger 16 and the terminal voltage Vc of the cell 1i, as they vary with time t.

As shown in FIG. 2, in a range of time t=0 to A, a charging is performed with the normal charge current Iu, till it reaches a point of time A, where the predicted cell voltage Vc+τ(dVc/dt) for a time t after the lapse of time τ becomes the upper limit voltage Vs. Therefore, the output current of the charger 16 is reduced. However, no sudden variation is achieved, thus needing a lapse of time τ to have a output current reduced to Id. Past the time point A, the cell terminal voltage rises with a moderate gradient till it arrives at a point of time D, where the cell terminal voltage reaches the upper limit voltage Vs, turning on the bypass circuit.

In a conventional device, an upper limit voltage Vs is reached at a point of time B, where a bypass circuit is operated, before entering a process for reducing an output current of a charger. Therefore, in a time period for the output current to be reduced, the charge current of a cell tends to become too excessive to be coped with a bypass circuit, causing the cell to be over-charged. However, in the embodiment, a cell voltage is predicted for a time after a lapse of time τ and, when the predicted voltage has reached an upper limit voltage, there is started in advance a control process for reducing an output current of a charger to a desirable level. Accordingly, in the embodiment, when the cell voltage has actually reached the upper limit voltage, the output current is sufficiently reduced for a bypass circuit to cope with, without causing an over-charge.

Figure 3:
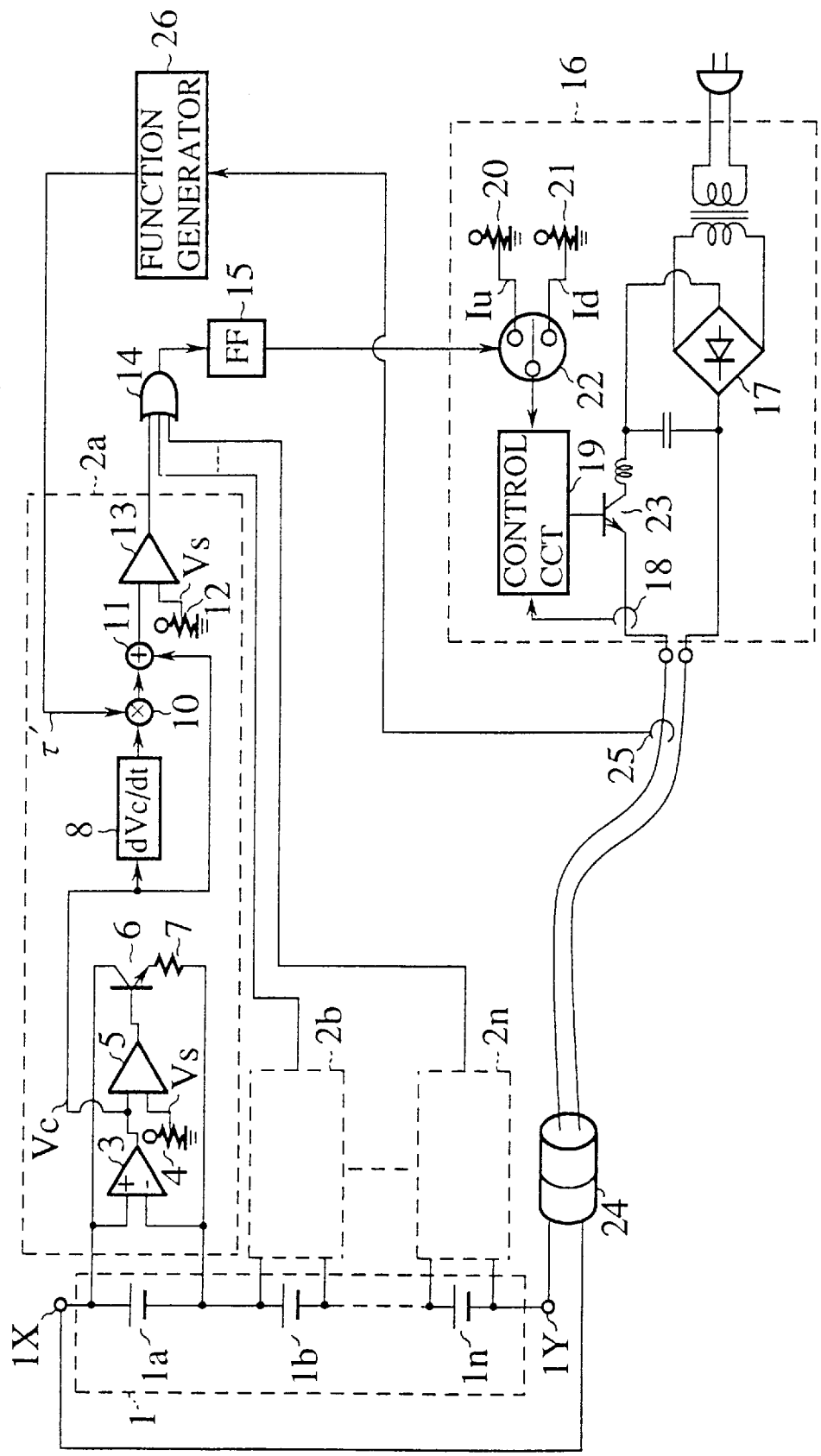
FIG. 3 is a circuit diagram of a charge control system according to another embodiment of the invention.

FIG. 3 is a circuit diagram of a charge control system according to a second embodiment of the invention.

The second embodiment is adaptive for a case in which an electric charger 16 has in a current control thereof a response characteristic variable in dependence on a magnitude of an initial charge current Iu.

In FIG. 3, designated at reference character 25 is an electric current sensor for detecting an output current of the charger 16, and 26 is a function generator for providing a response time τ' depending on the detected current. The function generator may comprise a stored table listing characteristic data, e.g. data on the response time τ' for various current values. As the response time becomes longer with an increase of charge current, the function generator 26 is set to a characteristic, e.g. a quadratic curve, for the response time τ' to increase in dependence on an increase of charge current. The response time τ' is output from the function generator 26 to a multiplier 10 for a described calculation.

In the second embodiment, a response time τ' is set in correspondence to an initial charge current Iu, permitting a charger 16 to achieve an adaptive current control to a variable initial charge current.

Figure 4:
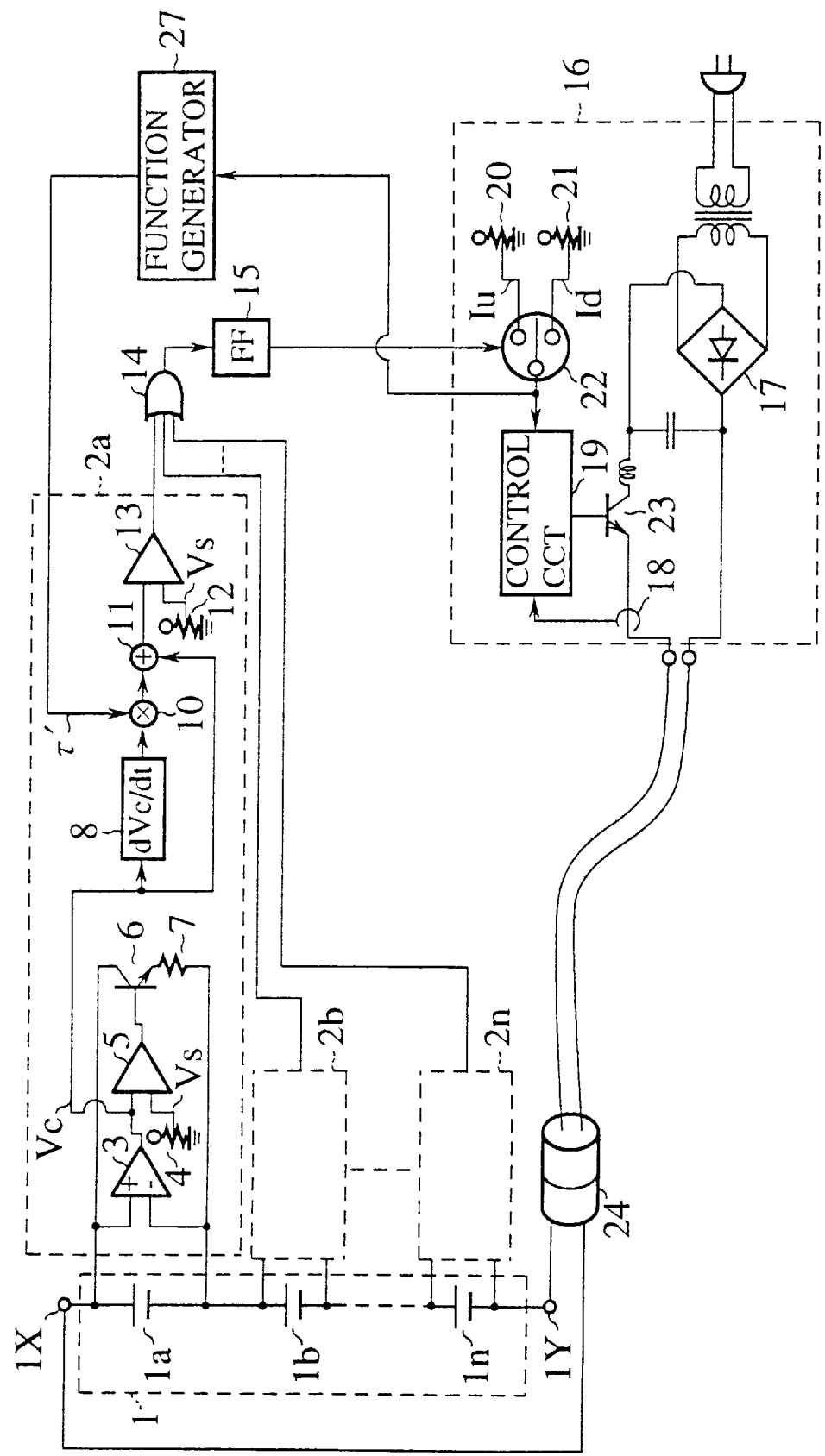
FIG. 4 is a circuit diagram of a charge control system according to still another embodiment of the invention.

FIG. 4 is a circuit diagram of a charge control system according to a third embodiment of the invention.

The third embodiment is identical to the second embodiment, as the current sensor 25 of the latter is omitted. In the third embodiment, a function generator 27 employs an output voltage of a switching circuit 22 as a signal representative of an initial charge current Iu.

Therefore, the function generator 27 of the third embodiment has a similar characteristic to that of the second embodiment, subject to the output voltage of the switching circuit 22 to be a voltage signal.

Figure 5:
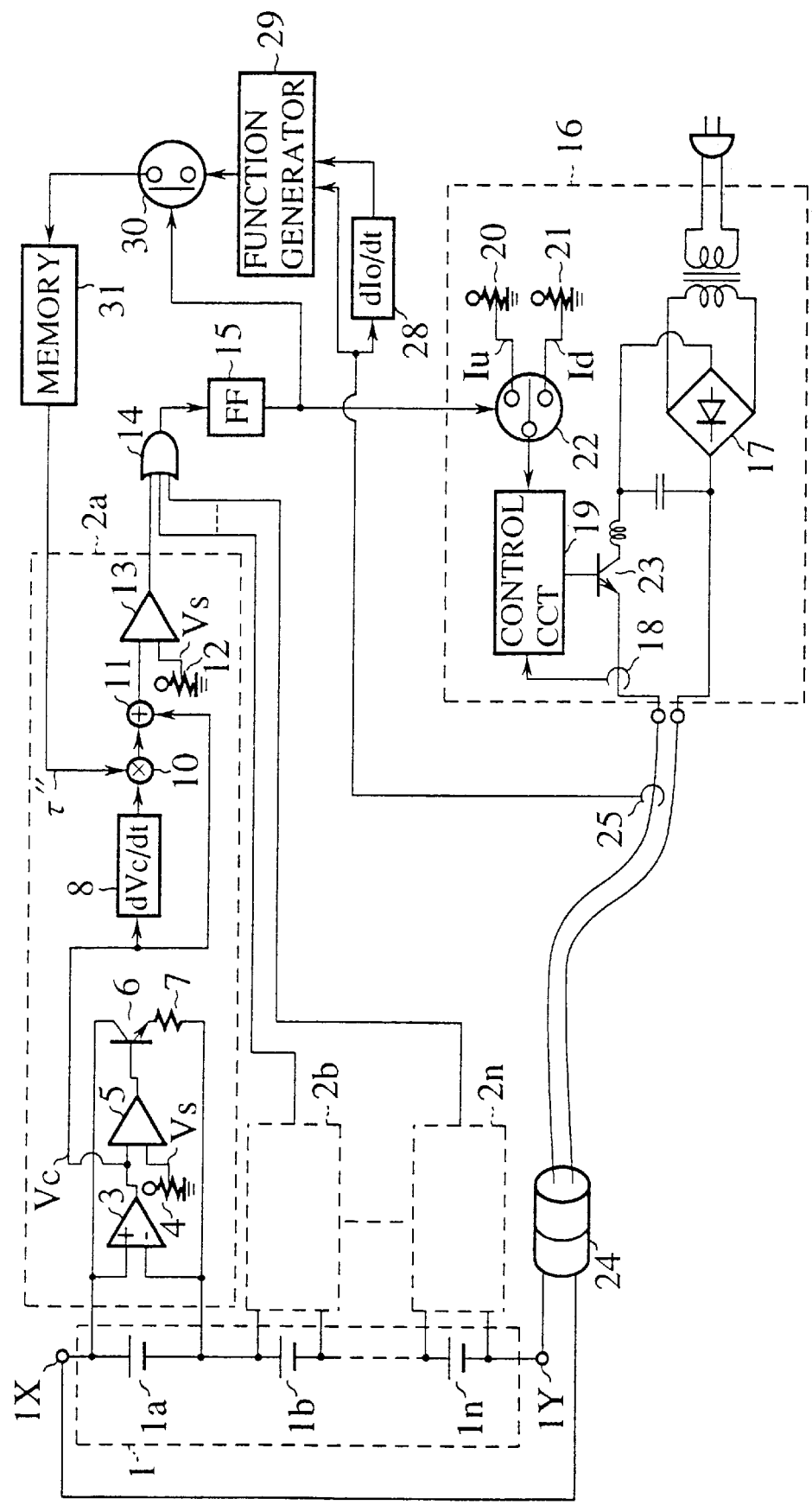
FIG. 5 is a circuit diagram of a charge control system according to yet another embodiment of the invention.

FIG. 5 is a circuit diagram of a charge control system according to a fourth embodiment of the invention.

The fourth embodiment is adapted to detect an actual response characteristic to determine a current actual response time τ" for use in a subsequent charge in combination with an additional study function.

As shown in FIG. 5, an output current Io of an electric charger 16 is detected by an electric current sensor 25, and a signal of the detected current Io is output therefrom on the one hand to a differentiator 28, where it is differentiated to be a value dIo/dt, and on the other hand to an input end of a function generator 29, whose another input end is supplied with a signal of the differentiated value dIo/dt from the differentiator 28. In the function generator 29, the signal of the detected current Io and that of the differentiated value dIo/dt are processed for an operation to determine the actual response time τ". More specifically, as the differentiated value dIo/dt is expressed in unit of ampere/sec, the operation in the function generator 29 is performed in a proportional manner such that:

$$\tau" = k\left[\{1/(dIo/dt)\}Io\right]$$

where k is a proportional constant.

The expression above is not defined when the charge current Io is constant. There is thus provided a switching circuit 30 which turns on to be conductive thereacross when a flip-flop circuit 15 has an output "1" (as an initiator of the current control), so that a value determined by the function generator 29 is input to a memory 31, where it is stored to be read later as a response time τ" in a subsequent charge.

In the fourth embodiment, there is thus detected an actual characteristic for a charger to output a charge current, to be employed as a response time in a subsequent charge, permitting an accurate control to be achieved.

While preferred embodiments of the present invention have been described using specific terms, such description is for illustrative purposes, and it is to be understood that changes and variations may be made without departing from the spirit or scope of the following claims.

What is claimed is:

1. A charge control system for a cell set including a serial connection or a series-parallel connection of a plurality of cells each respectively composed of a secondary battery or a plurality of modules each respectively consisting of a plurality of cells each respectively composed of a secondary battery, the charge control system comprising:

a charging means for outputting a charge current to charge the cell set, the charging means being controllable for a reduction of the charge current within a response period of time;

a plurality of bypass circuits each respectively controllable for a current conduction therethrough and connected in parallel to a corresponding one of the plurality of cells or a corresponding one of the plurality of modules; and a control means for controlling the charging means and a respective one of the plurality of bypass circuits to control a charge quantity of the corresponding cell or the corresponding module so that a voltage of the corresponding cell or the corresponding module is predicted with respect to a time point after a lapse of the response time, and the reduction of the charge current is started when the predicted voltage has reached an upper limit voltage set therefor.

2. A charge control system according to claim 1, wherein:

the charging means is controllable to reduce the charge current from a normal value thereof to a limited value thereof within the response time;

the corresponding cell or the corresponding module has a terminal voltage thereacross; and the predicted voltage is predicted as a sum of the terminal voltage and an increment thereof predicted in correspondence to the response time.

3. A charge control system according to claim 2, wherein the response time is variable in dependence on the normal value of the charge current.

4. A charge control system according to claim 3, wherein an initial value of the charge current is representative of the normal value of the charge current.

5. A charge control system according to claim 1, wherein the control means includes:

a means for detecting the charge current; and a means responsive to the detected charge current to provide the response time in a variable manner.

6. A charge control system according to claim 1, wherein the control means includes:

a means for detecting the response time in a current time of the reduction of the charge current;

a means for storing the response time of the current time; and a means responsible for the stored response time to provide a correspondent value as the response time in a subsequent time of the reduction of the charge current.

* * * * *